US012577825B1

(12) United States Patent
Ahmed et al.

(10) Patent No.: US 12,577,825 B1
(45) Date of Patent: Mar. 17, 2026

(54) VEHICLE-BASED CONTROL OF A MOVABLE BARRIER OPERATOR

(71) Applicant: The Chamberlain Group LLC, Oak Brook, IL (US)

(72) Inventors: Waheed Ahmed, Westmont, IL (US); Wei Lyn Lee, Arlington Heights, IL (US); Maged Riad, Roselle, IL (US); Sudarshan Ravindran, South Elgin, IL (US); Yang Yang, Kildeer, IL (US); Adelaide Zhang, Northbrook, IL (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 126 days.

(21) Appl. No.: 18/376,695

(22) Filed: Oct. 4, 2023

(51) Int. Cl.
*E05F 15/73* (2015.01)
*G08C 17/02* (2006.01)

(52) U.S. Cl.
CPC .............. *E05F 15/73* (2015.01); *G08C 17/02* (2013.01); *E05Y 2900/106* (2013.01); *G08C 2201/32* (2013.01); *G08C 2201/91* (2013.01)

(58) Field of Classification Search
CPC ..... E05F 15/73; G08C 17/02; G08C 2201/32; G08C 2201/91; E05Y 2900/106; G07C 9/00896; B60R 2300/8093
See application file for complete search history.

(56) References Cited

U.S. PATENT DOCUMENTS 5,990,828 A 11/1999 King
6,271,765 B1 8/2001 King
6,388,559 B1 5/2002 Cohen
6,476,732 B1 11/2002 Stephan
6,615,132 B1 9/2003 Nagasaka
6,707,421 B1 3/2004 Drury
7,088,265 B2 8/2006 Tsui
7,205,908 B2 4/2007 Tsui
7,286,933 B2 10/2007 Cho
(Continued)

FOREIGN PATENT DOCUMENTS

CN 103793978 5/2014
CN 111751852 10/2020
(Continued)

OTHER PUBLICATIONS

Smart Garage; MyQ; pp. 1-6; https://www.tesla.com/ownersmanual/model3/en_us/GUID-48B8F8C3-E7E0-4F7F-ABB6-E04FE7527628.html; Available on or before Jun. 9, 2023.

*Primary Examiner* — Vernal U Brown
(74) *Attorney, Agent, or Firm* — Dority & Manning, P.A.

(57) ABSTRACT

A method is provided for controlling operation of a garage door operator of a garage. The method includes tracking a travel distance of a vehicle from a parked location within a geo-fenced area that includes the garage toward a second location, determining a travel direction of the vehicle relative to a garage reference point of the garage and the parked location of the vehicle, and disabling an automatic close operation of the garage door operator based at least in part upon the travel direction being determined to be toward the garage reference point. The method further includes facilitating the automatic close operation based at least in part upon the travel direction not being toward the garage reference point and the travel distance satisfying a travel distance requirement.

22 Claims, 10 Drawing Sheets

(56) References Cited

U.S. PATENT DOCUMENTS

| | | | | |
|---|---|---|---|---|
| 7,532,965 | B2 | 5/2009 | Robillard | |
| 7,911,358 | B2 | 3/2011 | Bos | |
| 7,973,678 | B2 | 7/2011 | Petricoin, Jr. | |
| 8,049,595 | B2 | 11/2011 | Olson | |
| 8,115,616 | B2 | 2/2012 | Gonzaga | |
| 8,299,893 | B2 * | 10/2012 | Mullet | G07C 9/00182 340/5.71 |
| 8,544,523 | B2 | 10/2013 | Mays | |
| 8,643,465 | B2 | 2/2014 | Fitzgibbon | |
| 8,760,267 | B2 | 6/2014 | Bos et al. | |
| 9,208,629 | B2 | 12/2015 | Saladin | |
| 9,230,378 | B2 | 1/2016 | Chutorash | |
| 9,650,039 | B2 | 5/2017 | Hocking | |
| 9,970,229 | B1 | 5/2018 | Favila | |
| 10,198,938 | B2 | 2/2019 | Geerlings | |
| 10,209,081 | B2 | 2/2019 | Ghadiok | |
| 10,215,575 | B2 | 2/2019 | Zhang | |
| 10,410,448 | B2 | 9/2019 | Lickfelt | |
| 10,613,219 | B1 | 4/2020 | Decia | |
| 10,699,573 | B1 | 6/2020 | Mazuir | |
| 10,895,098 | B2 | 1/2021 | Riesebosch | |
| 11,036,238 | B2 | 6/2021 | Nobukawa | |
| 11,120,655 | B1 * | 9/2021 | Huggins | E05F 15/73 |
| 11,199,410 | B2 | 12/2021 | Jain | |
| 11,578,527 | B2 | 2/2023 | Hopkins | |
| 11,640,174 | B2 | 5/2023 | Tran | |
| 11,641,636 | B2 | 5/2023 | Manolakos | |
| 2008/0130791 | A1 | 6/2008 | Fitzgibbon | |
| 2018/0225898 | A1 * | 8/2018 | Kirkland | G07C 9/28 |
| 2022/0228876 | A1 | 7/2022 | Rani | |

FOREIGN PATENT DOCUMENTS

| | | |
|---|---|---|
| DE | 102007010291 | 9/2008 |
| JP | 2001238274 | 8/2001 |
| KR | 892150 | 4/2009 |

* cited by examiner

VEHICLE-BASED CONTROL OF A MOVABLE BARRIER OPERATOR

TECHNICAL FIELD

This disclosure relates to vehicle-based control of a movable barrier operator and, more specifically, to a vehicle that facilitate operation of a movable barrier operator based upon, for example, a location of the vehicle relative to a secured area associated with the movable barrier operator.

BACKGROUND

Various types of movable barrier operator systems are known such as garage door operators, sliding or swinging gate operators, rolling shutter systems, etc. Movable barriers are movable between closed and open positions to control access to secured areas such as a garage of a home. Some operations of these systems may be automatically enabled or triggered based on a location of a detected device associated with a user of the system.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments or aspects of the present disclosure. Also, common but well-understood elements of a commercially feasible embodiment are often not depicted in order to facilitate a less obstructed view of these various embodiments of the present disclosure. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein that utilize vehicle-based control of a movable barrier operator system. In particular, such systems and methods described herein can facilitate an automatic close operation of a movable barrier operator system based at least in part on a travel distance of a vehicle from a parked location. Furthermore, such systems and methods can disable the automatic close operation based on various factors such as an initial global navigation satellite system (GNSS) distance between the parked location and a garage reference point and/or a determined travel direction of the vehicle from the parked location with respect to a garage employing the movable barrier operator system.

Figure 1:
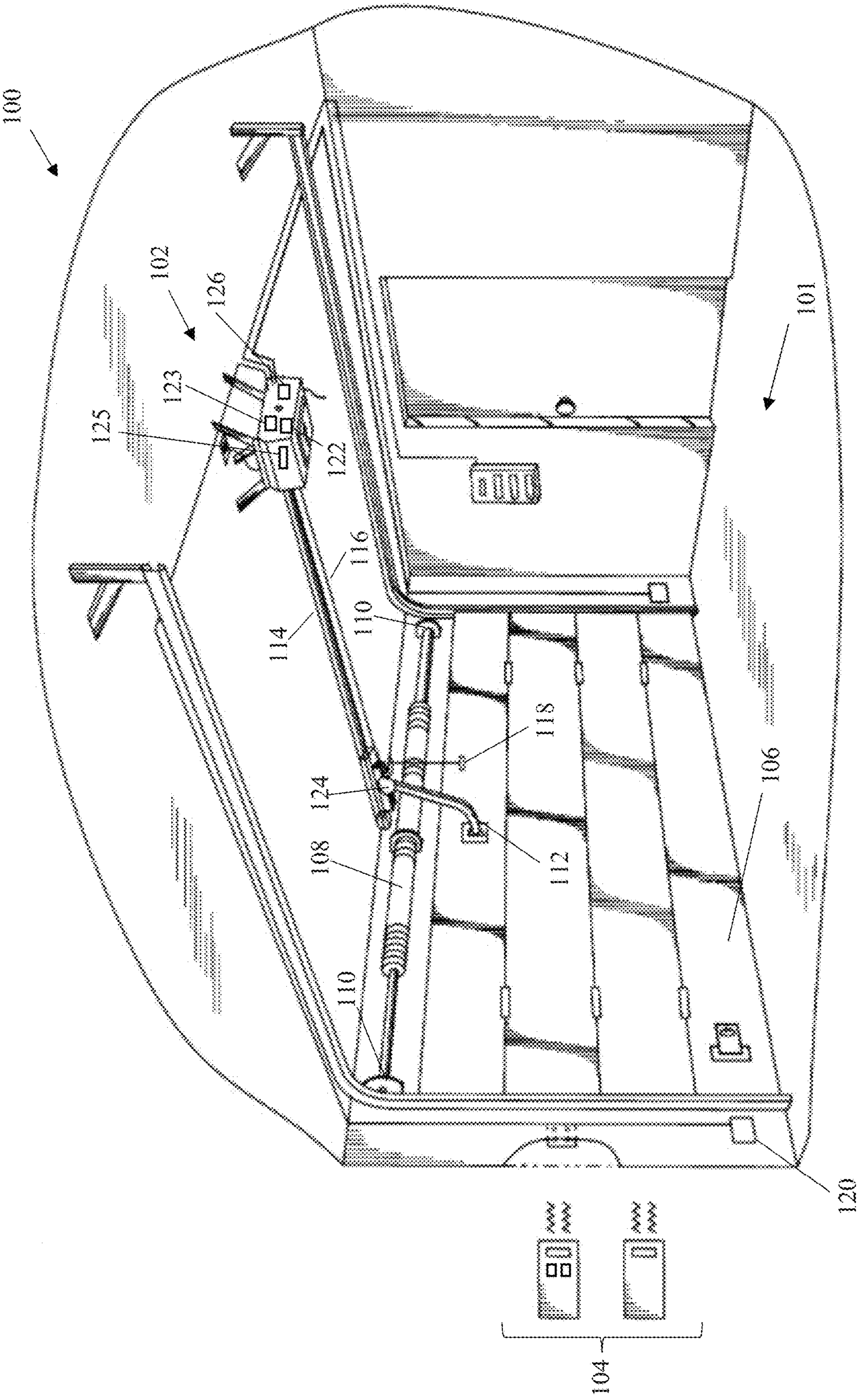
FIG. 1 is a perspective view of an example movable barrier operator system in a garage.

Referring now to FIG. 1, an example movable barrier operator system 100 is provided for operating a movable barrier such as a movable barrier 106 that limits access to a secured area such as a garage 101. In one embodiment, the movable operator system 100 includes a garage door operator 102 and one or more remote controls such as a transmitter 104. The one or more remote controls may also include, for example, a user device such as a smartphone, a laptop computer, a tablet computer, an in-vehicle device 206 (FIG. 2) such as an infotainment system coupled to an in-vehicle transmitter, a keypad external to the garage 101, a wall control, a visor-mounted remote control, and/or a handheld transmitter such as a key fob. The garage door operator 102 includes an electric motor 122, communication circuitry 123, and a control circuit (including a processor 125 and a memory 126). The processor 125 may include, for example, a microprocessor, a system-on-a-chip, an application specific integrated circuit (ASIC), and/or a field programmable gate array (FPGA). The memory 126 may include, for example, an electrical charge-based storage media such as EEPROM or RAM, or other non-transitory computer readable media.

In some embodiments, the movable barrier operator includes a rail 116 and transmission member 114 such as a chain, belt, or screw driven by the motor 122 relative to the rail 116. The electric motor 122 is operable to move the movable barrier 106 between open and closed positions. For example, a trolley 124 is coupled to the transmission member 114 as well as an arm 112 that is attached to the movable barrier 106. The motor 122 shifts the trolley 124 back-and-forth along the rail 116 to lift and lower the movable barrier 106. A release mechanism 118 is coupled to the trolley 124 to allow the movable barrier 106 to be disconnected from the garage door operator 102 for manual operation such as during a power failure.

The movable barrier operator system 100 includes a drum and cable mechanism 110 that is attached to the movable barrier 106. The drum and cable mechanism 110 includes a drum and a corresponding cable on each side of the movable barrier 106. The cable is payed out from and wound up onto the drum when the movable barrier 106 is respectively lowered and raised. The drum and cable mechanism 110 couples to a counterbalance such as a torsion spring 108 that assists in lifting the weight of the movable barrier 106 and enables the garage door operator 102 to open or close the movable barrier 106 via movement of the trolley 124. In some embodiments, a sensor such as a photo eye system 120 senses an object and/or a human who may be in the way of the movable barrier 106 as the movable barrier 106 closes.

Figure 2:
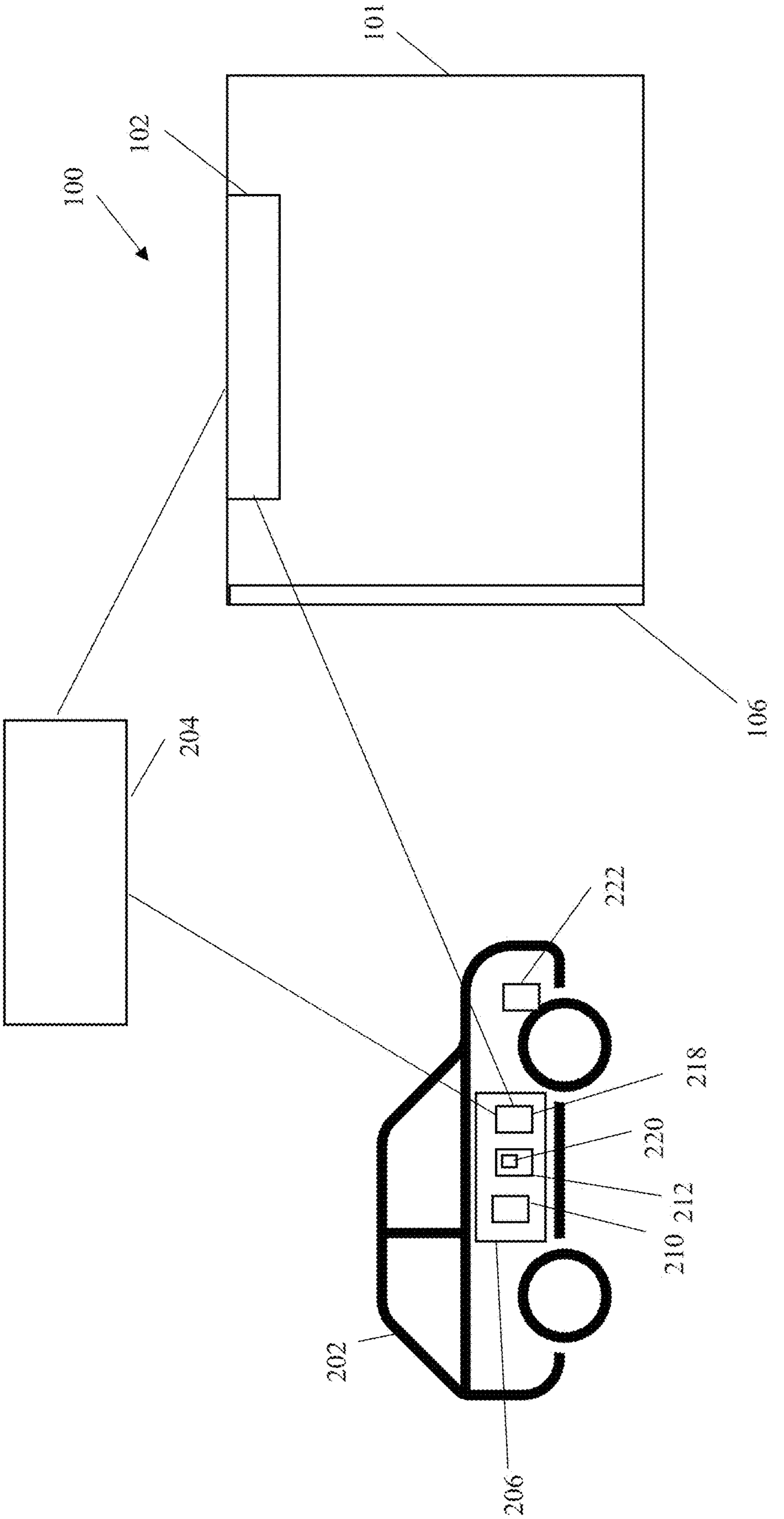
FIG. 2 is a schematic side elevational view of the movable barrier operator system and garage of FIG. 1.

As shown in FIG. 2 the movable barrier operator system 100 can be used in conjunction with a vehicle 202 and/or a remote computer such as server computer 204. Additionally, the in-vehicle device 206 can be provided with the vehicle 202 and can be configured to communicate with the garage door operator 102 either directly or via the server computer

204. In particular, the in-vehicle device 206 can include a processor 210, a memory 212, and a communication interface 218 for communicating with the server computer 204 and/or the garage door operator 102. The processor 210 may include, for example, a microprocessor, a system-on-a-chip, an application specific integrated circuit (ASIC), and/or a field programmable gate array (FPGA). The memory 212 may include, for example, an electrical charge-based storage media such as EEPROM or RAM, or other non-transitory computer readable media. Furthermore, the memory 212 can store therein instructions 220 that are executable by the processor 210 to perform all or portions of the various methods described herein. The communication interface 218 can facilitate communicating via one or more communication protocols, including but not limited to, wireless cellular data protocols, WI-FI protocols, Bluetooth protocols, infrared protocols, radio frequency protocols, etc.

As shown in FIG. 2, the vehicle 202 can be equipped with a sensor 222 usable by the processor 210 to determine relative changes in positions of the vehicle 202 between various positions. The sensor 222 may include a global navigation satellite system (GNSS) receiver, such as GPS, GLONASS, BeiDou, Galileo, etc. Alternatively or additionally, the sensor 222 can include a wheel pulse sensor, a compass, an accelerometer, LiDAR, ultra-wideband sensor and/or a gyroscope of the vehicle 202, but other sensor types known in the art may be used.

In operation, the in-vehicle device 206 is configured to facilitate an automatic close operation of the garage door operator 102. The automatic close operation can include the garage door operator 102 closing a presently open movable barrier 106 of the garage 101. In some embodiments, the automatic close operation can be determined or considered as an attended close operation (e.g. a close operation triggered by a transmitter that is within line-of-sight of the garage door operator) where lights, sounds, or similar notification elements are not activated by the garage door operator 102. However, in some embodiments, the automatic close operation can be determined or considered as an unattended close operation where the lights, sounds, or similar notification elements are activated by the garage door operator 102 prior to closing the movable barrier 106.

Figure 3:
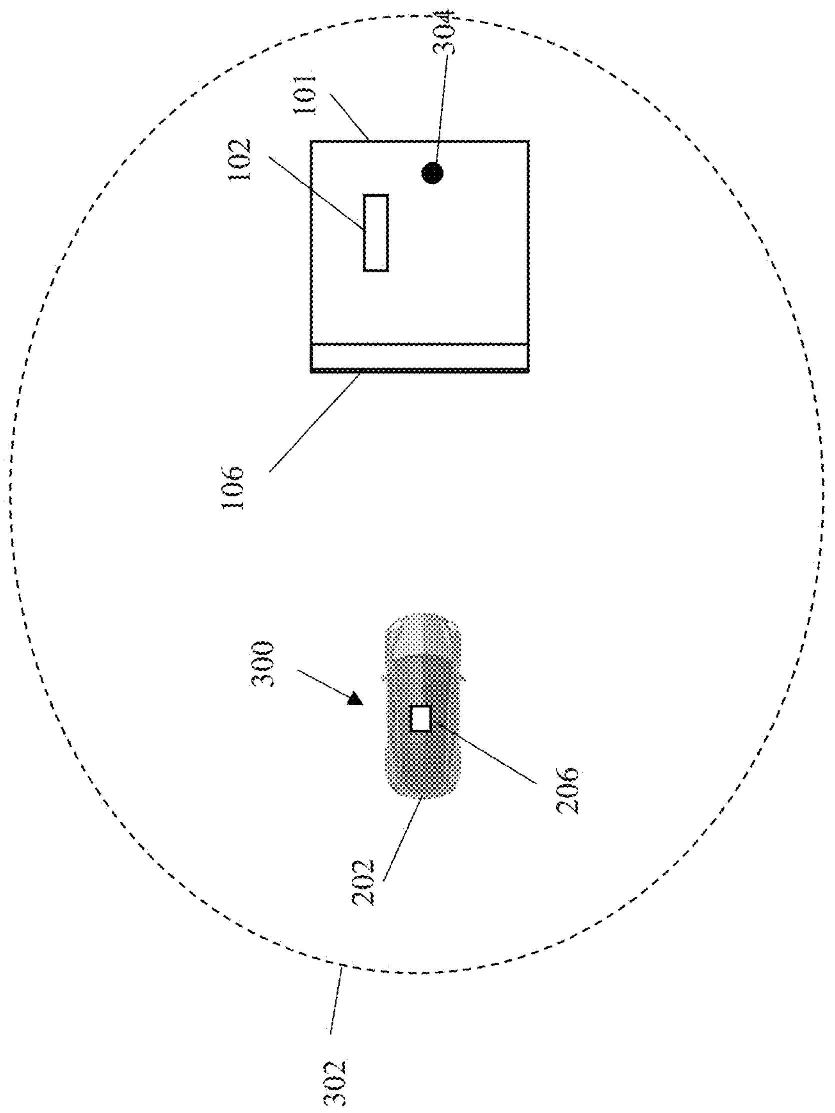
FIG. 3 is a schematic top plan view of the movable barrier operator system and garage of FIG. 1.

With reference to FIG. 3, when the processor 210 determines that the vehicle 202 is moving from a parked location 300 within a geo-fenced area 302 that includes the garage 101, the processor 210 can track a travel distance of the vehicle 202 from the parked location 300 toward a second location inside or outside of the geo-fenced area 302 and initiate or otherwise facilitate an auto close operation based at least in part upon the automatic close operation not being disabled and the travel distance satisfying a travel distance requirement. The auto close operation involves the movable barrier operator 102 closing the movable barrier 106 without a user providing a user input that causes the closing of the movable barrier 106, such as pressing a button of the transmitter 104. The processor 210 can track the travel distance using the sensor 222, such as by monitoring GNSS data for the vehicle 202 as the vehicle 202 moves from the parked location 300. Additionally, the processor 210 can determine that the parked location 300 is within the geo-fenced area 302 using the GNSS data for the vehicle 202 when the vehicle 202 is initially parked at the parked location 300. Furthermore, the processor 210 can determine that the vehicle 202 is currently moving from or is about to move from the parked location 300 by identifying a change in a driving mode (e.g., park, reverse, neutral, and drive) of the vehicle 202 from the driving mode the vehicle 202 was in when immediately before being parked at the parked location 300.

For example, the processor 210 can begin tracking the travel distance when the drive mode of the vehicle 202 is changed to reverse from park, when the vehicle 202 was in drive immediately before stopping at the parked location 300. The vehicle 202 may have been in drive as the vehicle pulled into a driveway associated with the garage 101, parked, then turned off. When the vehicle 202 is turned on and put in reverse and starts backing out of the driveway, the processor 210 can track the travel distance of the vehicle 202. A similar example includes the vehicle 202 operating in reverse as the vehicle 202 backs into the driveway, turns off, then is subsequently turned on and put in drive to leave the driveway. In this manner, the processor 210 may use the change of the driving mode of the vehicle 202 as a trigger for determining the vehicle 202 is moving from, or is about to move from, the parked location 300.

In order to limit unexpected initiation of the automatic close operation, the processor 210 is configured to disable the automatic close operation by referencing the parked location 300 and a garage reference point 304 within the geo-fenced area 302. The garage reference point 304, like the parked location 300, can be a specific GNSS point within the geo-fenced area 302. In particular, the garage reference point 304 can be located within the garage 101 as shown in FIG. 3. In some embodiments, the garage reference point 304 can be a center point of the geo-fenced area 302. In some embodiments, when the automatic close operation is disabled or not yet configured/setup, the processor 210 can prompt a driver of the vehicle 202 to initiate a close operation of the garage door operator 102 via user input (e.g., activating a user interface element on display screen of the vehicle 202) upon the vehicle 202 leaving the geo-fenced area 302.

Figure 4:
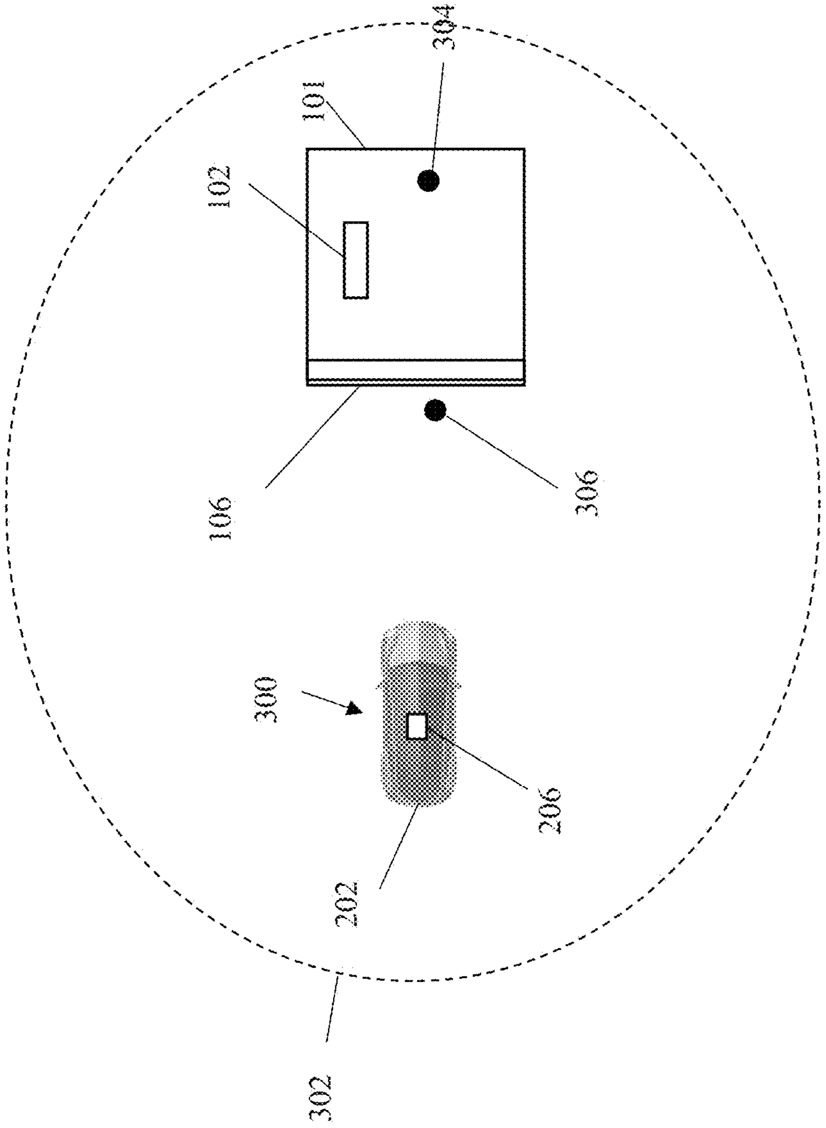
FIG. 4 is a schematic top plan view of the movable barrier operator system and garage of FIG. 1.
Figure 5:
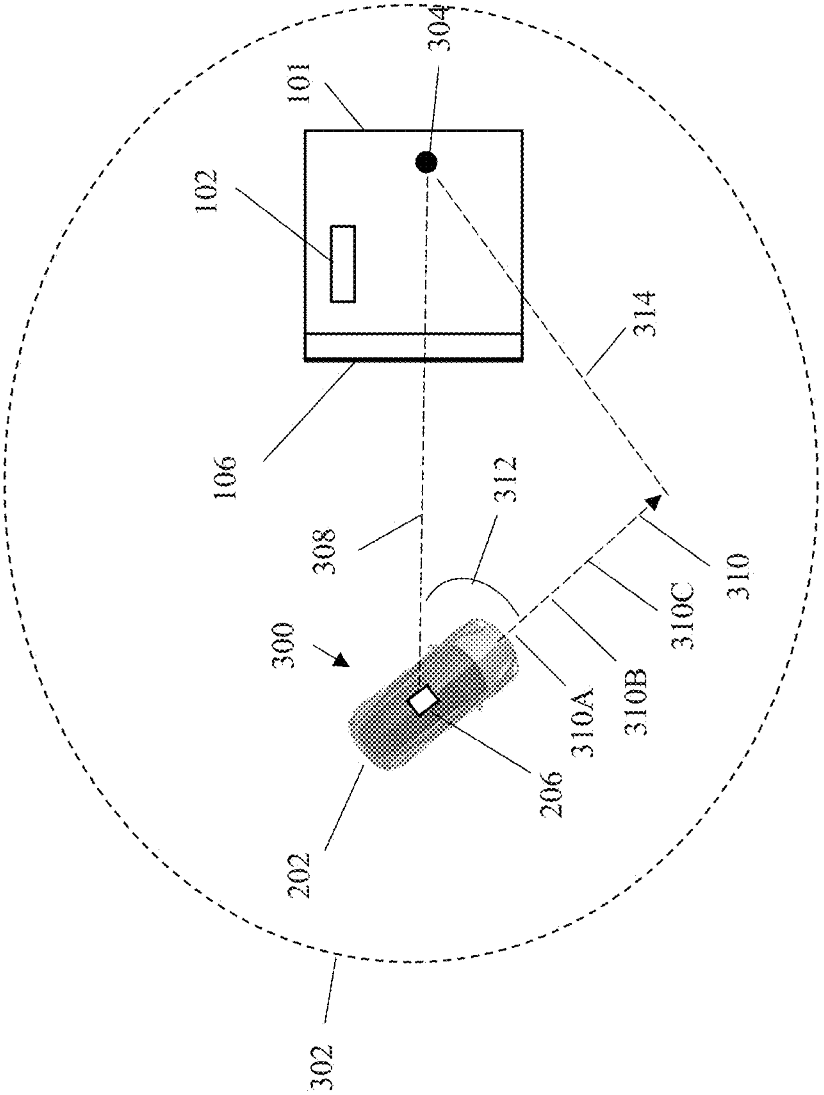
FIG. 5 is a schematic top plan view of the movable barrier operator system and garage of FIG. 1.
Figure 6:
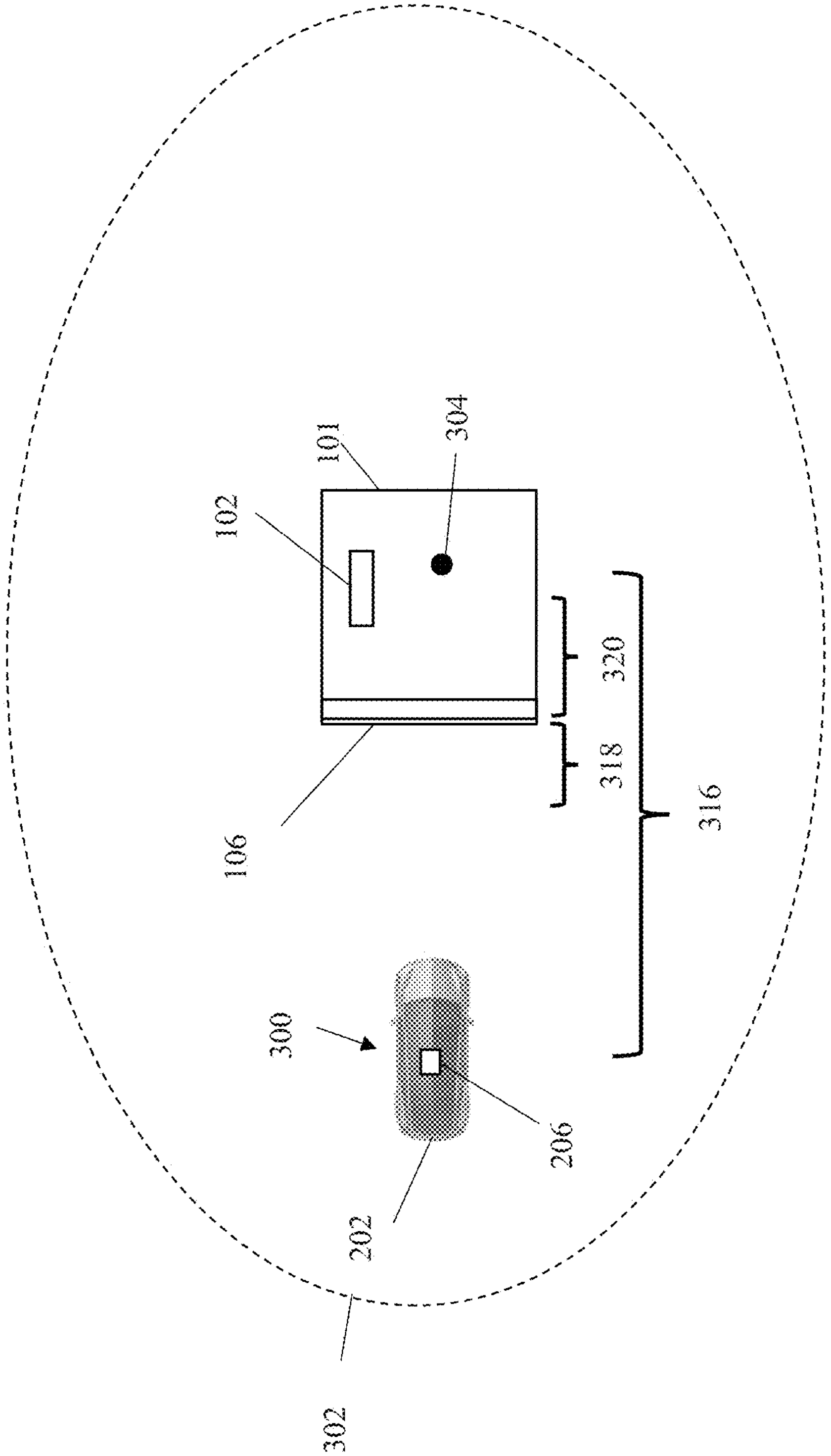
FIG. 6 is a schematic top plan view of the movable barrier operator system and garage of FIG. 1.

With reference to FIGS. 4-6, three different processes for selectively controlling the automatic close operation will be discussed in detail. In particular, a dynamic distance process, a dynamic angle process, and a static distance process will be discussed with respect to FIGS. 4, 5, and 6, respectively.

Dynamic Distance Process

As shown in FIG. 4, the processor 210 can utilize a second reference point 306 in addition to the parked location 300 and the garage reference point 304 to decide whether to disable the automatic close operation. The second reference point 306 can include a GNSS reference point within the geo-fenced area 302. Furthermore, as shown in FIG. 4 the second reference point 306 can be established outside of the garage 101, the garage reference point 304 can be established inside the garage 101, and a line connecting the second reference point 306 and the garage reference point 304 can be aligned along or parallel with a straight path for the vehicle 202 into the garage 101. The straight path can be generally perpendicular to an opening of the garage 101 protected by the movable barrier 106.

In operation, the processor 210 can dynamically monitor a first distance between the vehicle 202 and the garage reference point 304 and a second distance between the vehicle 202 and the second reference point 306 as the vehicle moves from the parked location 300. Then, the processor 210 can disable the automatic close operation when the changes to the first distance and the second distance indicate a travel direction of the vehicle 202 is toward the garage 101 and/or the garage reference point 304. Specifically, the processor 210 determines the vehicle 202 is traveling toward the garage 101 when both the first distance and the second distance dynamically decrease together as the vehicle 202 moves from the parked location 300 toward the second location.

The processor 210 can disable the automatic close operation by, for example, cancelling or resetting the travel distance tracking initiated after the vehicle 202 begins to move from the parked location 300, can refrain from sending an automatic close operation command to the sever computer 204 and/or the garage door operator 102, and/or can send an automatic close operation disable command to the server computer 204 and/or the garage door operator 102.

Dynamic Angle Process

As shown in FIG. 5, the processor 210 can identify and utilize a straight-line path 308 between the parked location 300 and the garage reference point 304, a driving direction 310 of the vehicle 202, and an angle 312 between the driving direction 310 and the straight-line path 308, to decide whether to disable the automatic close operation. In particular, the processor 210 can dynamically monitor the driving direction 310 and the angle 312 at a plurality of positions, e.g., positions 310A, 310B, 310C, of the vehicle 202 after the vehicle 202 begins to leave the parked location 300 but prior to the travel distance satisfying the travel distance requirement. Furthermore, the processor 210 can determine a distance value 314 between each of the plurality of positions of the vehicle 202 and the garage reference point 304 using corresponding values of the angle 312 and the travel distance from the parked location 300 identified while the vehicle 202 was at each of the plurality of positions. The distance value 314 can be determined using trigonometric equations by assuming an approximately straight line path for the vehicle 202 from the parked location 300. In particular, the distance value 314 (i.e., DG) at each of the plurality of positions can be determined using Equation 1 below, where DWP is the distance value of the straight-line path 308, ATD is the travel distance from the parked location 300 at the current one of the plurality of positions, and α is the current angle 312.

$$DG = \sqrt{DWP^2 + ATD^2 - 2 * DWP * ATD * \cos\alpha} \quad \text{Equation 1}$$

The processor 210 can disable the automatic close operation when an average of values of DG (i.e. distance values 314) from the plurality of locations as calculated via Equation 1 is less than the distance of the straight-line path 308. When the average of the distance values 314 is less than the distance of the straight-line path 308, the processor 210 can determine the vehicle 202 is moving towards the garage reference point 304. The average of all the distance values 314 can be determined after the travel distance satisfies the travel distance requirement or can be determined on a running basis as each of the distance values 314 are identified. The processor 210 can disable the automatic close operation in any of the ways described above with respect to the dynamic distance process.

Static Distance Process

As shown in FIG. 6, the processor 210 can utilize a static initial GNSS distance 316 between the parked location 300 and the garage reference point 304, a closing offset distance 318, a garage dimension 320, and other values stored in the memory 126 or accessible from the server computer 204. These other values can include a GNSS error value, a default maximum value for the travel distance requirement, and a default minimum value for the travel distance requirement. The GNSS error value can include a specific value determined by one or more of the methods described herein. Alternatively, the GNSS error value can include a pre-set maximum error value that generally accounts for variability in the GNSS error based on environmental conditions, satellite signal receiver precision, etc. Additionally, the closing offset distance 318 can include a pre-set distance value in which the vehicle 202 would generally be able to stop when encountering an unanticipated closing of the movable barrier 106. The garage dimension 320 may be half the length of the garage 101 as measured from the movable barrier 106 into the garage 101. In some embodiments, the closing offset distance 318 can be approximately five feet and the garage dimension 320 can be approximately ten feet. Furthermore, in some embodiments the garage dimension 320 can be a function of a total length of the garage 101 (e.g., the garage dimension 320 can be set to half the total length of the garage 101). Additionally, the closing offset distance can be in a range of about three feet to about fifteen feet.

The processor 210 can be configured to first identify the static initial GNSS distance 316 from the parked location 300 and the garage reference point 304 using a GNSS system of the in-vehicle device 206 such as a Global Positioning System (GPS) or similar. For example, the processor 210 can compare GNSS data at the parked location 300 to the GNSS data for the garage reference point 304 and identify the differences between those data points as the static initial GNSS distance 316. Then, the processor 210 can identify a maximum GNSS distance and a minimum GNSS distance using the static initial GNSS distance 316 and the GNSS error value. In some embodiments, the maximum GNSS distance is the static initial GNSS distance 316 plus the GNSS error value, and the minimum GNSS distance is the static initial GNSS distance 316 minus the GNSS error value.

After identifying the maximum and minimum GNSS distances, the processor 210 can calculate a first value and a second value using the default maximum value, the minimum GNSS distance, the garage dimension 320, and the closing offset distance 318. In particular, the first value can be the sum of the default maximum value, the closing offset distance 318, and the garage dimension 320. The second value can be the minimum GNSS distance minus the closing offset distance 318 and the garage dimension 320.

The processor 210 can then disable the automatic close operation in response to: (1) the maximum GNSS distance being greater than or equal to the default maximum value, (2) the minimum GNSS distance being less than or equal to the first value, and (3) the second value being less than the default minimum value. The processor 210 can disable the automatic close operation in any of the ways described above with respect to the dynamic distance process.

Additionally, in some embodiments, the processor 210 can modify the travel distance requirement to the second value instead of disabling the automatic close operation entirely. In particular, the processor 210 can modify the travel distance requirement to the second value in response to: (1) the maximum GNSS distance being greater than or equal to the default maximum value, (2) the minimum GNSS distance being less than or equal to the first value, (3) the second value being greater than the default minimum value, and (4) the second value being less than the default maximum value.

Figure 7:
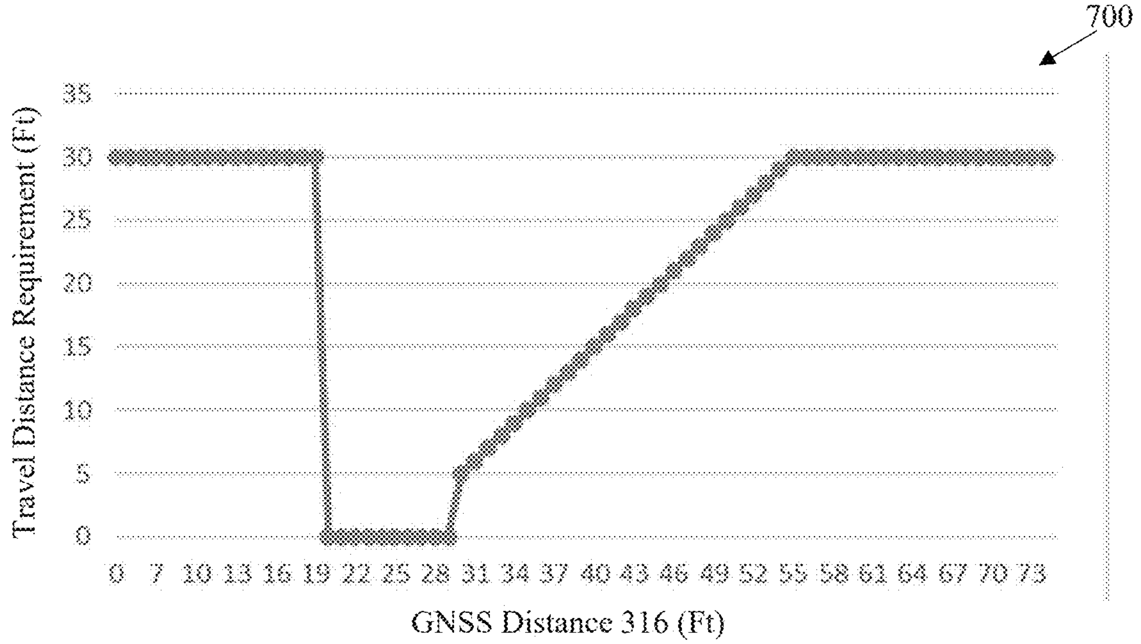
FIGS. 7 and 8 are graphs showing a travel distance requirement as a function of a distance of a vehicle to a reference point.

FIG. 7 shows an example graph 700 for a case where the GNSS error value is ten feet, the default maximum value is thirty feet, the default minimum value is five feet, the closing offset distance 318 is five feet, and the garage dimension 320 is ten feet. A vertical axis value of zero for the travel distance requirement shown in the graph 700 indicates distances for which the auto close operation is disabled. As shown in FIG. 7, for values of the static initial GNSS distance 316 less than twenty feet, the travel distance requirement is set to the default maximum value of thirty feet. Then, from distances of less than thirty feet but greater than or equal to twenty feet, the automatic close operation is disabled because the second value as calculated for those values of the static initial GNSS distance 316 is less than the default minimum value. Then, from distances of greater than or equal to thirty feet but less than fifty five feet, the travel distance requirement can be set to the second value because the second value as calculated for those values of the static initial GNSS distance 316 is greater than or equal to the default minimum value but less than the default maximum value. Finally, for values of the static initial GNSS distance 316 greater than or equal to fifty five feet, the travel distance requirement can be set to the default maximum value because the second value as calculated for those values of the static initial GNSS distance 316 is greater than or equal to the default maximum value.

Figure 8:
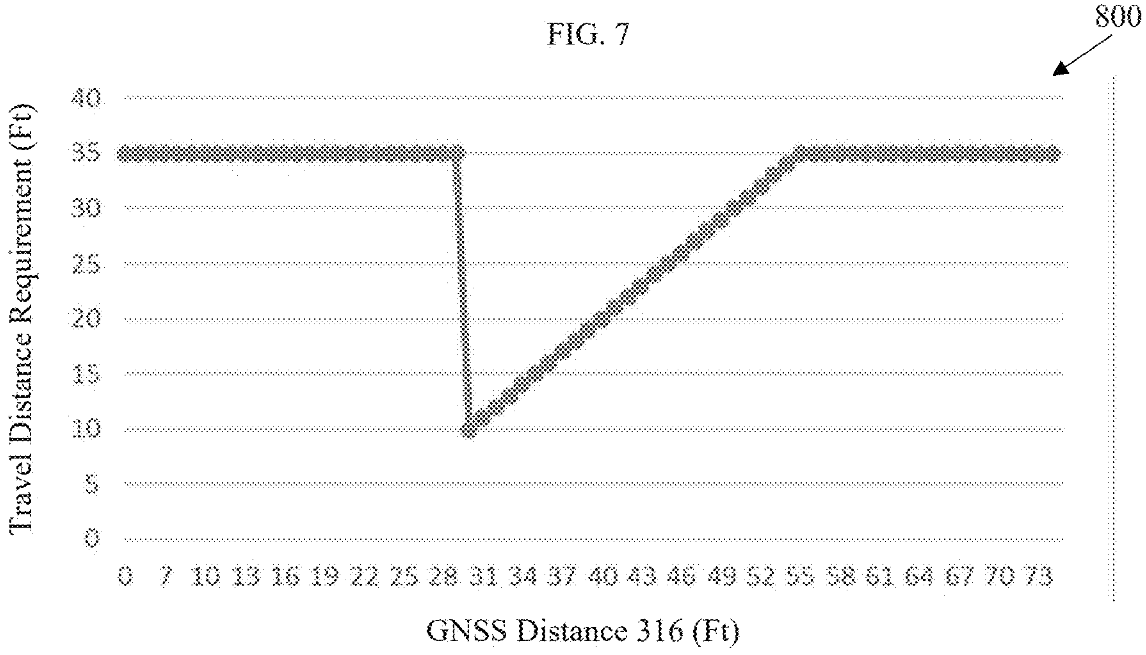

FIG. 8 shows another example graph 800 for a case where the GNSS error value is five feet, the default maximum value is thirty five feet, the default minimum value is again five feet, the closing offset distance 318 is again five feet, and the garage dimension 320 is again ten feet. A vertical axis value of zero for the travel distance requirement in the graph 800, like in the graph 700, would indicate GNSS distances 316 for which the auto close operation would be disabled. However, the specific parameter conditions for the case shown in FIG. 8 do not include any such values. As shown in FIG. 8, for values of the static initial GNSS distance 316 less than thirty feet, the travel distance requirement is set to the default maximum value of thirty five feet. Then, from distances of greater than or equal to thirty feet but less than fifty five feet, the travel distance requirement can be set to the second value because the second value as calculated for those values of the static initial GNSS distance 316 is greater than or equal to the default minimum value but less than the default maximum value. Finally, for values of the static initial GNSS distance 316 greater than or equal to fifty five feet, the travel distance requirement can be set to the default maximum value because the second value as calculated for those values of the static initial GNSS distance 316 is greater than or equal to the default maximum value.

Figure 9:
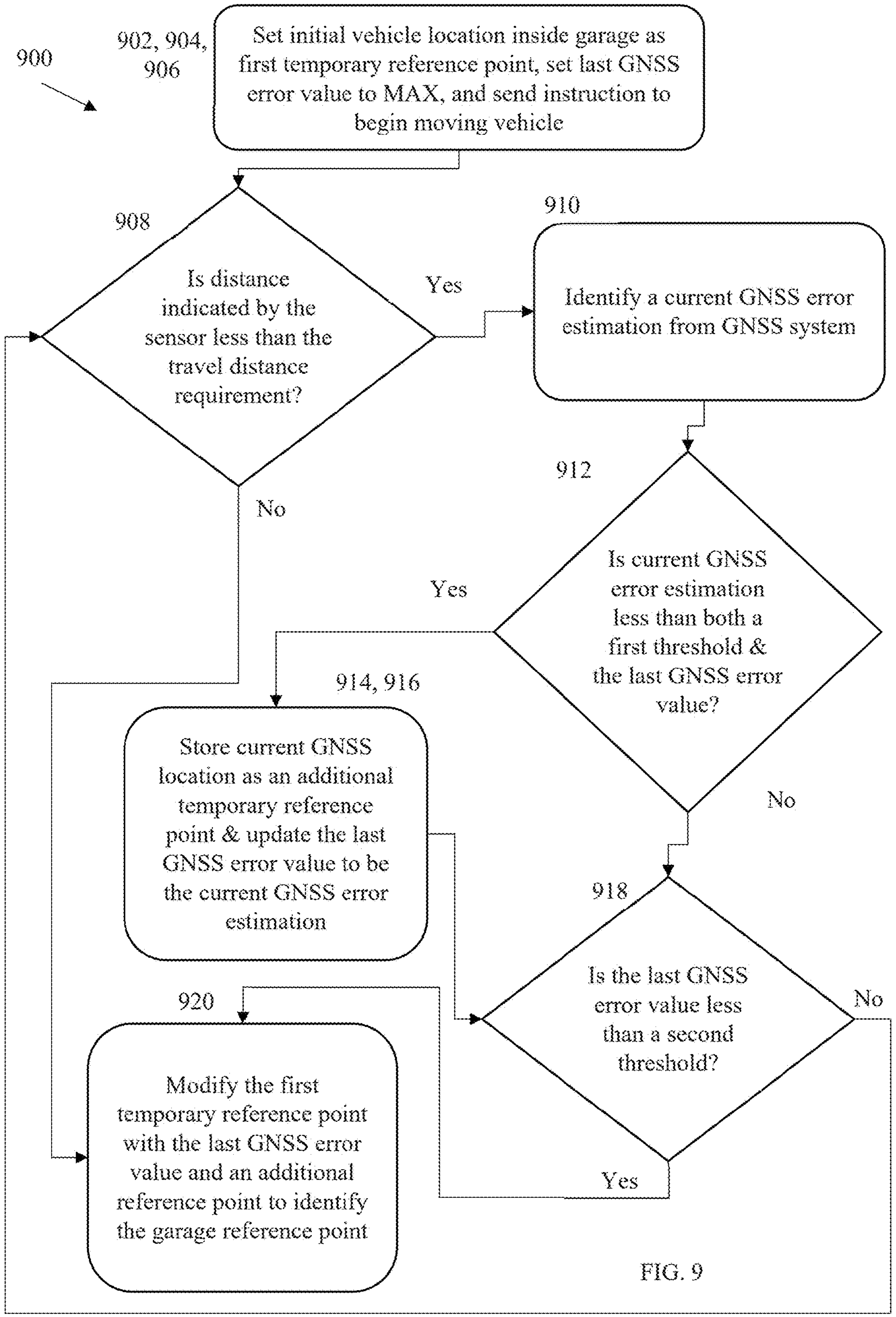
FIG. 9 is a flow diagram of a method for determining a GNSS error value and setting a garage reference point.

The GNSS error value and the garage reference point 304 can be determined utilizing the method 900 shown in FIG. 9. The example method 900 includes the processor 210 setting 902 an initial location of the vehicle 202 within the garage 101 as a first temporary reference point, setting 904 a last GNSS error value to a MAX default value, and sending 906 instructions (e.g., a user prompt) to begin moving the vehicle 202. In some embodiments, the MAX default value can be three hundred feet. Then, the method 900 can include the processor 210 determining 908 whether a travel distance indicated by the sensor 222 is less than the travel distance requirement. When the travel distance indicated by the sensor 222 is less than the travel distance requirement, the method 900 can include identifying 910 a current GNSS error estimation of the GNSS system of the vehicle. The current GNSS error estimation may be a mathematical operation performed by the GNSS system of the vehicle based upon the GNSS data received by the GNSS system upon start-up of the vehicle. Then, the method 900 can include the processor 210 determining 912 whether the current GNSS error value is less than both a first threshold and the last GNSS error value. The first threshold utilized at step 912 may be considered a maximum allowed GNSS error for the system, such as three meters.

When the current GNSS error estimation is less than both the first threshold and the last GNSS error value at operation 912, the method 900 can include the processor 210 storing 914 a current GNSS location of the vehicle 202 as an additional temporary reference point and updating 916 the last GNSS error value to be the current GNSS error estimation. Then, the method 900 includes the processor 210 determining 918 whether the last GNSS error value is less than a second threshold. If the last GNSS error value is not less than the second threshold, the method 900 returns to the determining 908 operation. The second threshold utilized at step 918 may be an ideal or acceptable GNSS error for the vehicle.

Then, when the results of determining 908 indicate that the travel distance indicated by the sensor 222 is not less than the travel distance requirement or the result of the determining 918 indicate that the last GNSS error value is less than the second threshold, the method 900 can include the processor 210 modifying 920 the first temporary reference point with the last GNSS error value and associated additional reference point to identify the garage reference point 304.

Alternative methods for setting the GNSS error value, the garage reference point 304, and/or the second reference point described herein are also possible. For example, the processor 210 can inform a driver to park the vehicle 202 in front of movable barrier 106 in a geo-fence setting dialog on a display inside the vehicle 202. Furthermore, the processor 210 can provide a visual feedback of GNSS accuracy with user interface (UI) elements presented on the display (e.g. accuracy bars or the like). Then, the processor 210 can display a request for the driver to drive the vehicle 202 forwards or backwards to find an optimal location where the GNSS error is at a minimum (e.g., the UI element progress bar can identify good and bad locations). Then, the processor 210 can record a reference point (e.g., ref-point-1) after receiving user confirmation. After the reference point is recorded, the processor 210 can prompt the driver to drive the vehicle 202 into the garage 101 while continually recording location points along the way. Then, the processor 210 can request confirmation from the driver that the vehicle 202 is completely inside the garage 101. After receiving such confirmation, the processor 210 can determine location data for the vehicle 202 inside of the garage 101 using the location points recorded during the drive into the garage 101 and the recorded reference point, ref-point-1.

Operating Methods

Figure 10:
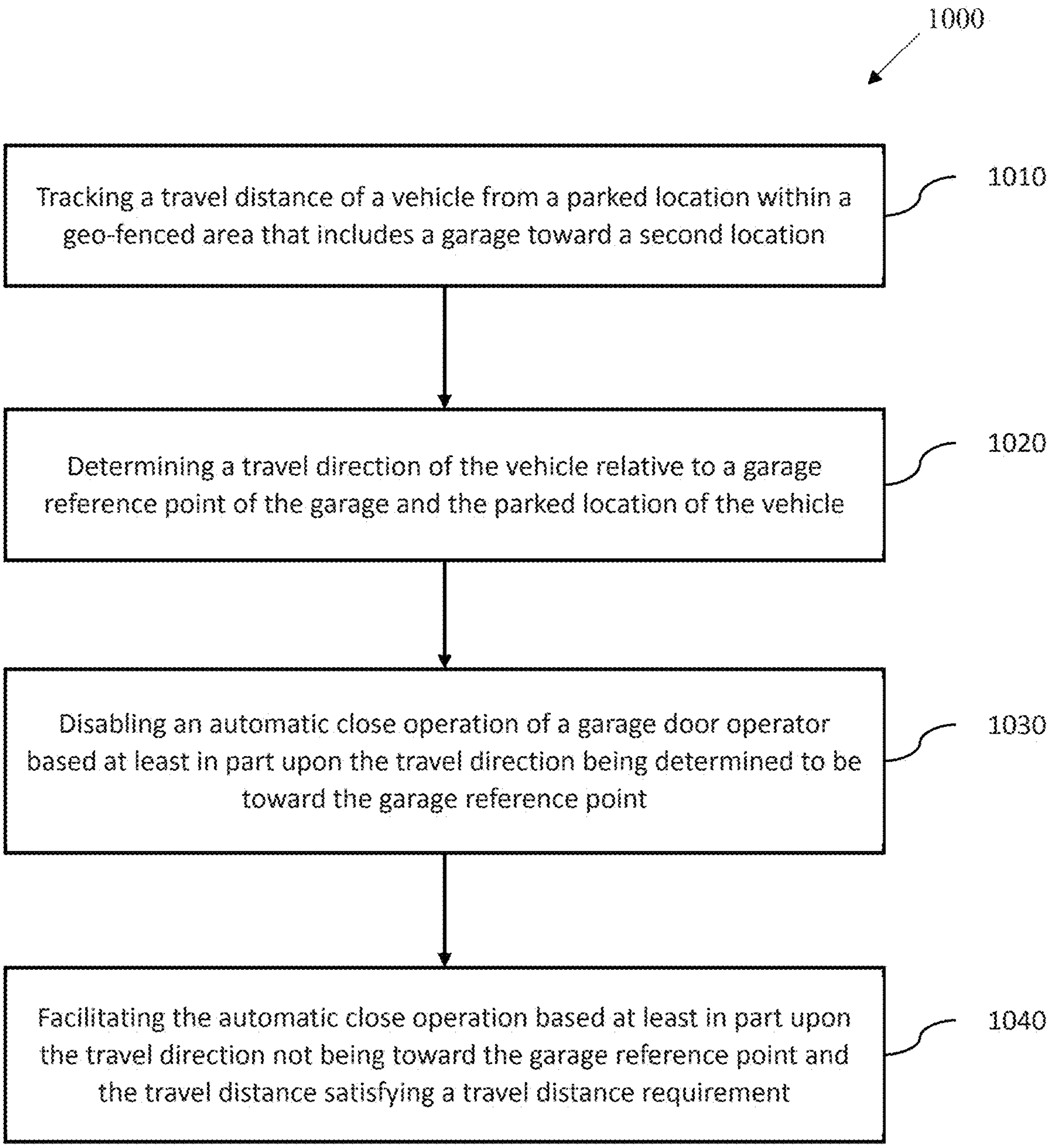
FIG. 10 is a flow diagram of an example method of operating a movable barrier operator.
Figure 11:
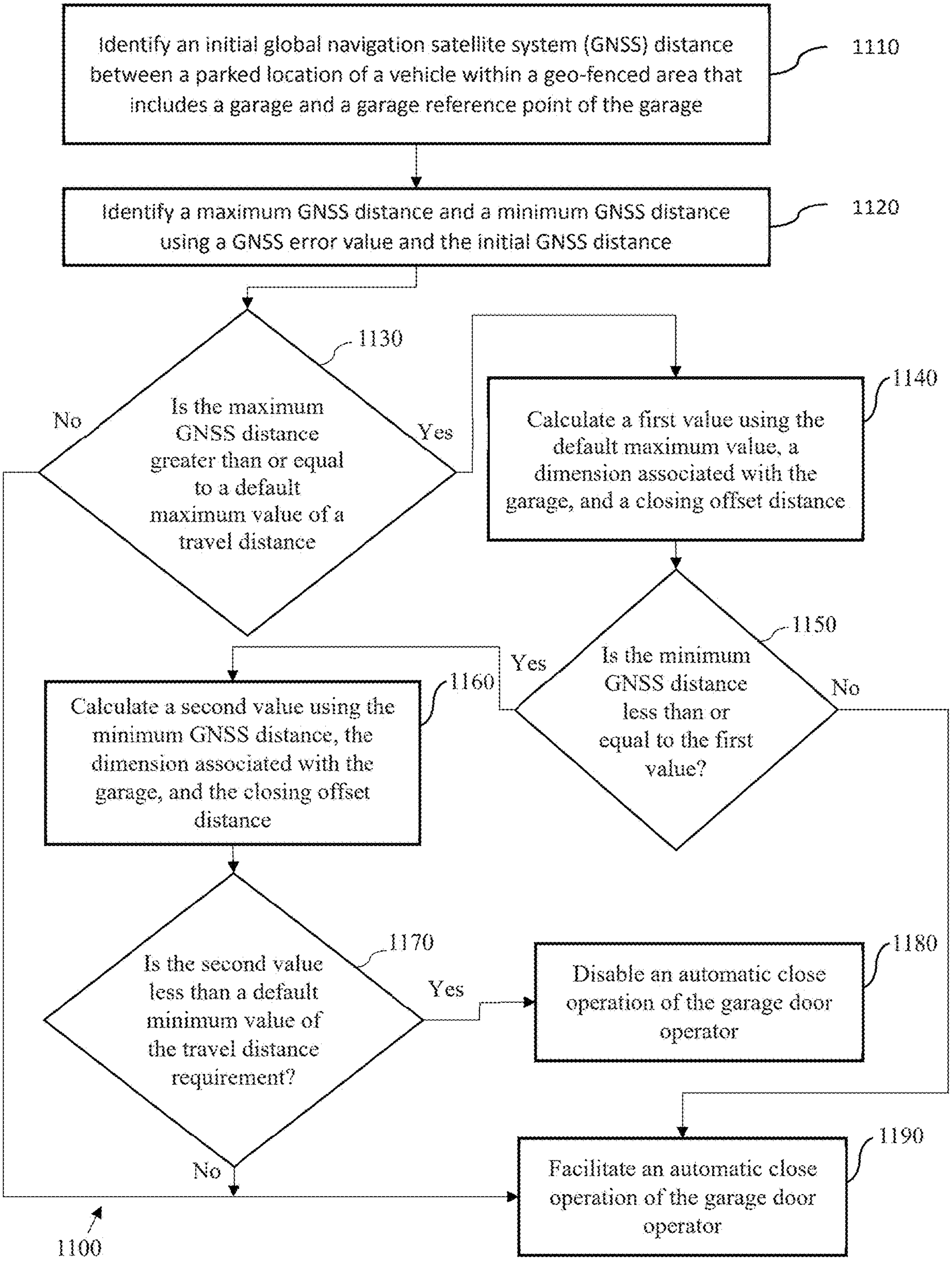
FIG. 11 is a flow diagram of an example method of operating a movable barrier operator.

The dynamic distance process, the dynamic angle process, and/or the static distance process discussed above with respect to FIGS. 4, 5, and 6, respectively can be utilized by the processor 210 in conjunction with operating methods 1000 and 1100 shown in FIGS. 10 and 11.

The method 1000, shown in FIG. 10, includes tracking 1010 the travel of the vehicle 202 from the parked location 300 within the geo-fenced area 302 that includes the garage 101 toward the second location. Then, the method 1000 includes determining 1020 the travel direction of the vehicle 202 relative to the garage reference point 304 of the garage 101 and the parked location 300. Next, the method 1000 includes disabling 1030 the automatic close operation of the garage door operator 102 based at least in part upon the travel direction being determined to be toward the garage reference point 304. The disabling 1030 can employ the dynamic distance process and/or the dynamic angle process to determine the travel direction. Finally, the method 1000 can include facilitating 1040 the automatic close operation based at least in part upon the travel direction not being toward the garage reference point 304 and the travel distance satisfying the travel distance requirement.

The method 1100, shown in FIG. 11, includes identifying 1110 an initial global navigation satellite system (GNSS) distance between the parked location 300 and the garage reference point 304 (e.g. identifying the static initial GNSS distance 316). Then, the method 1100 includes identifying 1120 the maximum GNSS distance and the minimum GNSS distance using the GNSS error value and the initial GNSS distance. Next, the method 1100 includes determining 1130 whether the maximum GNSS distance is greater than or equal to the default maximum value of the travel distance requirement. Then, when the result of the determining 1130 is positive, the method 1100 can include calculating 1140 the first value using the default maximum value, the dimension associated with the garage (e.g., garage dimension 320), and the closing offset distance 318. Then, the method 1100 includes determining 1150 whether the minimum GNSS distance is less than or equal to the first value. When the result of the determining 1150 is positive, the method 1100 can include calculating 1160 the second value using the minimum GNSS distance, the dimension associated with the garage (e.g., garage dimension 320), and the closing offset distance 318. Then, the method 1100 includes determining 1170 whether the second value is less than the default minimum value of the travel distance requirement. When the results of the determining 1170 are positive, the method 1100 can include disabling 1180 the automatic close operation of the garage door operator 102. However, when the results of any of the determining operations 1130, 1150, and/or 1170 are negative, the method 1100 can include facilitating 1190 the automatic close operation of the garage door operator 102. In some embodiments the facilitating 1190 is done in response to the travel distance of the vehicle 202 meeting the travel distance requirement.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A vehicle comprising:

memory for storing data identifying a garage reference point of a garage within a geofenced area;

a communication interface;

a processor electrically coupled to the memory and the communication interface, the processor facilitating, via the communication interface, an automatic close operation of a garage door operator of the garage based at least in part upon a travel direction of the vehicle not being toward the garage reference point and a travel distance of the vehicle relative to the garage reference point satisfying a travel distance requirement; and a sensor operatively connected to the processor;

wherein the processor uses data from the sensor to track the travel distance of the vehicle as the vehicle moves from a parked location within the geofenced area, and wherein the processor is configured to determine the travel direction of the vehicle and disable the automatic close operation when the travel direction is determined to be toward the garage reference point.

2. The vehicle of claim 1 wherein the memory is configured to store data identifying a second reference point within the geofenced area, wherein the second reference point is established outside of the garage and the garage reference point is established in the garage, wherein the processor is configured to determine the travel direction of the vehicle relative to the garage reference point by:

monitoring a first distance between the vehicle and the garage reference point as the vehicle moves from the parked location, monitoring a second distance between the vehicle and the second reference point as the vehicle moves from the parked location, and determining the travel direction to be toward the garage reference point in response to the first distance and the second distance decreasing as the vehicle moves from the parked location.

3. The vehicle of claim 2 wherein a line between the garage reference point and the second reference point is parallel to a straight path for the vehicle to travel into an opening of the garage.

4. The vehicle of claim 2 wherein the parked location, the garage reference point, and the second reference point are associated with global navigation satellite system (GNSS) location data received by the sensor; and wherein the processor is configured to modify the parked location, the garage reference point, and the second reference point to account for a GNSS error value stored in the memory, and wherein the processor is configured to monitor the first distance and the second distance by comparing additional GNSS location data, received by the processor as the vehicle moves from the parked location, to the garage reference point, and the second reference point, the additional GNSS location data being modified by the GNSS error value.

5. The vehicle of claim 1 wherein the processor is configured to determine the travel direction of the vehicle relative to the garage reference point by:

identifying a straight-line path and a straight-line distance between the parked location and the garage reference point;

tracking an angle between a driving direction of the vehicle and the straight-line path while tracking the travel distance;

identifying a plurality of distance values between a plurality of positions of the vehicle and the garage reference point as the vehicle moves from the parked location toward a second location using values of the angle and corresponding values of the travel distance; and identifying the travel direction as towards the garage when an average of the plurality of distance values is less than the straight-line distance.

6. The vehicle of claim 5 wherein the sensor comprises a global navigation satellite system (GNSS) receiver.

7. The vehicle of claim 5 wherein the parked location and the garage reference point are associated with GNSS location data received by the sensor.

8. The vehicle of claim 1 wherein the processor is configured to determine the garage reference point by:

identifying an initial GNSS location of the vehicle when located at an initial position inside the garage as a first temporary reference point;

monitoring movement of the vehicle from the initial position to one or more subsequent positions;

determining relative changes in positions of the vehicle between each of the one or more subsequent positions using the sensor;

identifying a GNSS error by comparing subsequent GNSS locations of the vehicle while at the one or more subsequent positions to the initial GNSS location as modified according to the relative changes in positions; and modifying the first temporary reference point with the GNSS error to identify the garage reference point.

9. The vehicle of claim 1 wherein the sensor includes a wheel pulse sensor and/or a gyroscope.

10. The vehicle of claim 1 wherein the processor is configured to facilitate the automatic close operation by controlling the communication interface to communicate a signal to the garage door operator.

11. A vehicle comprising:

a memory for storing a global navigation satellite system (GNSS) error value and data identifying an initial GNSS distance between a garage reference point of the garage and a parked location of the vehicle within a geo-fenced area that includes a garage;

a processor operatively connected to the memory, the processor configured to:

identify a maximum GNSS distance and a minimum GNSS distance using the GNSS error value and the initial GNSS distance; and disable an automatic close operation of a garage door operator in response to:

the maximum GNSS distance being greater than or equal to a default maximum value of a travel distance requirement, the minimum GNSS distance being less than or equal to a first value calculated using the default maximum value of the travel distance requirement, a dimension of the garage, and a closing offset distance, and a second value being less than a default minimum value of the travel distance requirement, the second value calculated using the minimum GNSS distance, the dimension of the garage, and the closing offset distance.

12. The vehicle of claim 11 further comprising a communication interface, and wherein the processor is further configured to:

track a travel distance of the vehicle from the parked location; and control the communication interface to facilitate the automatic close operation based at least in part upon the automatic close operation not being disabled and the travel distance satisfying the travel distance requirement.

13. The vehicle of claim 12 wherein the processor is further configured to modify the travel distance requirement to be the second value in response to:

the maximum GNSS distance being greater than or equal to the default maximum value of the travel distance requirement, the minimum GNSS distance being less than or equal to the first value, the second value being greater than or equal to the default minimum value of the travel distance requirement, and the second value being less than the default maximum value of the travel distance requirement.

14. A non-transitory computer readable medium storing instructions that, when executed by a processor, cause performance of operations comprising:

tracking a travel distance of a vehicle from a parked location within a geo-fenced area that includes a garage toward a second location;

determining a travel direction of the vehicle relative to a garage reference point of the garage and the parked location of the vehicle, wherein determining the travel direction of the vehicle includes:

identifying a straight-line path and a straight-line distance between the parked location and the garage reference point;

tracking an angle between a driving direction of the vehicle and the straight-line path while tracking the travel distance;

identifying a plurality of distance values between a plurality of positions of the vehicle and the garage reference point as the vehicle moves from the parked location toward a second location using values of the angle and corresponding values of the travel distance; and identifying the travel direction to be toward the garage when an average of the plurality of distance values is less than the straight-line distance;

disabling an automatic close operation of a garage door operator of the garage based at least in part upon the travel direction being determined to be toward the garage reference point; and facilitating the automatic close operation based at least in part upon the travel direction not being toward the garage reference point and the travel distance satisfying a travel distance requirement.

15. The non-transitory computer readable medium of claim 14 wherein determining the travel direction of the vehicle includes:

monitoring a first distance between the vehicle and the garage reference point as the vehicle moves from the parked location, the garage reference point established in the garage;

monitoring a second distance between the vehicle and a second reference point as the vehicle moves from the parked location, the second reference point established outside of the garage; and determining the travel direction to be toward the garage reference point in response to the first distance and the second distance decreasing as the vehicle moves from the parked location toward the second location.

16. The non-transitory computer readable medium of claim 15 wherein a line between the garage reference point and the second reference point is parallel with a straight path for the vehicle to travel into an opening of the garage.

17. The non-transitory computer readable medium of claim 14 wherein the operations include:

identifying an initial global navigation satellite system (GNSS) location of the vehicle when located at an initial position inside the garage as a first temporary reference point;

monitoring movement of the vehicle from the initial position to one or more subsequent positions;

determining relative changes in positions of the vehicle between each of the one or more subsequent positions using data received from a sensor of the vehicle;

identifying a GNSS error by comparing subsequent GNSS locations of the vehicle while at the one or more subsequent positions to the initial GNSS location as modified according to the relative changes in positions; and modifying the first temporary reference point with the GNSS error to identify the garage reference point.

18. The non-transitory computer readable medium of claim 17 wherein the sensor includes a wheel pulse sensor of the vehicle and/or a gyroscope of the vehicle.

19. The non-transitory computer readable medium of claim 14 wherein facilitating the automatic close operation includes communicating a close command from the vehicle to the garage door operator.

20. A non-transitory computer readable medium storing instructions that, when executed by a processor, cause performance of operations comprising:

identifying an initial global navigation satellite system (GNSS) distance between a garage reference point of a garage and a parked location of a vehicle within a geo-fenced area that includes the garage;

identifying a maximum GNSS distance and a minimum GNSS distance using a GNSS error value and the initial GNSS distance; and disabling an automatic close operation of a garage door operator for the garage in response to:

the maximum GNSS distance being greater than or equal to a default maximum value of a travel distance requirement, the minimum GNSS distance being less than or equal to a first value calculated using the default maximum value of the travel distance requirement, a dimension of the garage, and a closing offset distance, and a second value being less than a default minimum value of the travel distance requirement, the second value calculated using the minimum GNSS distance, the dimension of the garage, and the closing offset distance.

21. The non-transitory computer readable medium of claim 20 wherein the operations further include:

tracking a travel distance of the vehicle from the parked location; and facilitating the automatic close operation based at least in part upon the automatic close operation not being disabled and the travel distance satisfying the travel distance requirement.

22. The non-transitory computer readable medium of claim 20 wherein the operations further include modifying the travel distance requirement to be the second value in response to:

the maximum GNSS distance being greater than or equal to the default maximum value of the travel distance requirement, the minimum GNSS distance being less than or equal to the first value, the second value being greater than or equal to the default minimum value of the travel distance requirement, and the second value being less than the default maximum value of the travel distance requirement.

* * * * *